United States Patent
Halbrook et al.

(10) Patent No.: US 11,205,215 B2
(45) Date of Patent: Dec. 21, 2021

(54) ONLINE PLATFORM FOR PROCESSING MERCHANDISE SHIPPING

(71) Applicant: Walmart Apollo, LLC, Bentonville, AR (US)

(72) Inventors: Courtland J. Halbrook, Centerton, AR (US); Steve Simpson, Bentonville, AR (US); Kim Haughn, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 450 days.

(21) Appl. No.: 15/917,258

(22) Filed: Mar. 9, 2018

(65) Prior Publication Data

US 2018/0260880 A1 Sep. 13, 2018

Related U.S. Application Data

(60) Provisional application No. 62/469,994, filed on Mar. 10, 2017.

(51) Int. Cl.
*G06Q 30/00* (2012.01)
*G06Q 30/06* (2012.01)
*G06Q 10/08* (2012.01)

(52) U.S. Cl.
CPC ..... *G06Q 30/0635* (2013.01); *G06Q 10/0835* (2013.01); *G06Q 10/0838* (2013.01)

(58) Field of Classification Search
CPC ........... G06Q 30/0635; G06Q 10/0835; G06Q 10/0836; G06Q 10/0838
See application file for complete search history.

(56) References Cited

U.S. PATENT DOCUMENTS

| 6,151,582 A | 11/2000 | Huang et al. |
| 7,181,419 B1* | 2/2007 | Mesaros ............ G06Q 30/0224 705/26.2 |
| 7,191,142 B1* | 3/2007 | Sandell .......... G06Q 10/063114 705/7.15 |

(Continued)

OTHER PUBLICATIONS

De Vasconcelos, Diogo Merguizo, and Paulo Carlos Kaminski. "Development of a supplier and purchase order management product/service under the 4PL logistics concept: a case study." Product: Management and Development 11.2 (2013): 125-135.*

*Primary Examiner* — Kathleen Palavecino
(74) *Attorney, Agent, or Firm* — Duane Morris LLP; Manita Rawat

(57) ABSTRACT

Systems, methods, and processor-readable storage media for processing merchandise shipping are provided to ensure that a supplier fulfills a purchase order in a manner that will keep a supply chain filled with the product based on a demand. For example, when a purchase order is generated, a timer can be activated. Within a predetermined period, the supplier can confirm fulfilment of purchase order through an online platform. Based on this confirmation and historical data collected for the supplier, a shipping location and other shipping parameters can be predicted by the online platform. If the timer is expired and no supplier's confirmation is received or if the supplier denies confirming the fulfilment of purchase order, a default operation is initiated. The default operation may cause canceling of purchase order or communicating to the supplier to resolve any issues.

20 Claims, 4 Drawing Sheets

(56) References Cited

U.S. PATENT DOCUMENTS

| | | | |
|---|---|---|---|
| 7,212,976 B2 | 5/2007 | Scheer | |
| 7,668,761 B2 | 2/2010 | Jenkins et al. | |
| 8,160,971 B2 | 4/2012 | Knight | |
| 8,732,023 B2 | 5/2014 | Mikurak | |
| 10,268,892 B1* | 4/2019 | Miller | H04B 1/3888 |
| 2008/0077464 A1* | 3/2008 | Gottlieb | G06Q 10/087 705/28 |
| 2013/0018696 A1 | 1/2013 | Meldrum | |
| 2013/0144763 A1* | 6/2013 | Skyberg | G06Q 50/28 705/27.1 |
| 2016/0217399 A1 | 7/2016 | Roelofs et al. | |
| 2016/0217406 A1 | 7/2016 | Najmi | |

* cited by examiner

ONLINE PLATFORM FOR PROCESSING MERCHANDISE SHIPPING

CROSS-REFERENCE TO RELATED APPLICATIONS

This application claims priority of U.S. Provisional Patent Application No. 62/469,994 filed Mar. 10, 2017, which is incorporated herein by reference in its entirety for all purposes.

BACKGROUND

1. Technical Field

The present disclosure relates to an online platform for processing merchandise shipping and, more specifically, to a system and a method for processing merchandise shipping from one or more suppliers to a retail store.

2. Introduction

Traditionally, businesses find it advantageous to operate with small inventory levels to minimize storage costs and accommodate risks of price or demand changes. To maintain small inventory level, businesses maintain supply chains involving selected suppliers or vendors. The selected suppliers can supply certain goods to a business to fulfill a demand. Many large businesses, such as retail stores, often send purchase orders to their suppliers in a repeated manner. The businesses have little to no control or insight into when the suppliers accept the purchase order. A supplier may not currently have the goods to fill an order, but expects to in several days. The supplier may delay acknowledging the purchase order for several days, increasing lead times for the business.

In addition, the businesses expect that their suppliers submit routing requests for carrier assignments in response to the purchase orders. Traditionally, it is for a business to collect purchased goods from a supplier. In a routing request, a supplier can indicate an expected pick up date, pick up location, as well as a nature, weight, and volume of consignment. In response, the business arranges for the delivery of the consignment from the supplier. The supplier keeps the consignment ready for a carrier to pick up on the scheduled date and time.

Suppliers and business often face challenges with routing and shipping. For example, a ready-to-ship routing and shipping are traditionally highly manual processes vulnerable to errors and omissions. It is common that when a routing request is entered late by a supplier, service deadlines are missed, which drives down in-stock and on-shelf availability of certain goods. Moreover, short shipping by a supplier is often not discovered until receipt by the business. In addition, suppliers selecting non-optimal shipping pick-up locations can result in increased lead times, increased transportation costs, and missed service expectations.

SUMMARY

Disclosed herein are systems, methods, and computer-readable storage mediums for improved processing of merchandise routing and shipping, which overcome at least some drawbacks known in the art. An exemplary method for processing merchandise shipping can include: maintaining an online platform accessible by selected suppliers and a merchant; receiving, through the online platform, a purchase order of the merchant, the purchase order indicating at least a supplier and a product; in response to receiving the purchase order, activating a timer for counting elapsing time of a predetermined period; determining if a confirmation message is received, through the online platform, from the supplier within the predetermined period and in response to the purchase order; if it is determined that the confirmation message is received within the predetermined period, determining if the purchase order is to be fulfilled by the supplier based at least on the confirmation message; based at least on the determination that the purchase order is to be fulfilled by the supplier, predicting a shipping location of the product based on historical data; and causing shipment of the product from the shipping location.

An exemplary system for processing merchandise shipping can include a database storing historical data associated with past shipments and purchase orders; and a server maintaining an online platform accessible by selected suppliers and a merchant, wherein the server is configured to: receive, through the online platform, a purchase order of the merchant, the purchase order indicating at least a supplier and a product; in response to receiving the purchase order, activate a timer for counting elapsing time of a predetermined period; determine if a confirmation message is received, through the online platform, from the supplier within the predetermined period and in response to the purchase order; if it is determined that the confirmation message is received within the predetermined period, determine if the purchase order is to be fulfilled by the supplier based at least on the confirmation message; based at least on the determination that the purchase order is to be fulfilled by the supplier, predict a shipping location of the product based on historical data; and cause shipment of the product from the shipping location.

An exemplary non-transitory processor-readable storage medium can have instructions stored thereon, which when executed by one or more processors, cause the one or more processors to implement a method for processing merchandise shipping, where the method comprises: maintaining an online platform accessible by selected suppliers and a merchant; receiving, through the online platform, a purchase order of the merchant, the purchase order indicating at least a supplier and a product; in response to receiving the purchase order, activating a timer for counting elapsing time of a predetermined period; determining if a confirmation message is received, through the online platform, from the supplier within the predetermined period and in response to the purchase order; if it is determined that the confirmation message is received within the predetermined period, determining if the purchase order is to be fulfilled by the supplier based at least on the confirmation message; based at least on the determination that the purchase order is to be fulfilled by the supplier, predicting a shipping location of the product based on historical data; and causing shipment of the product from the shipping location.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Embodiments of this disclosure are illustrated by way of an example and not limitation in the figures of the accompanying drawings, in which like references indicate similar elements and in which.

DETAILED DESCRIPTION

Figure 1:
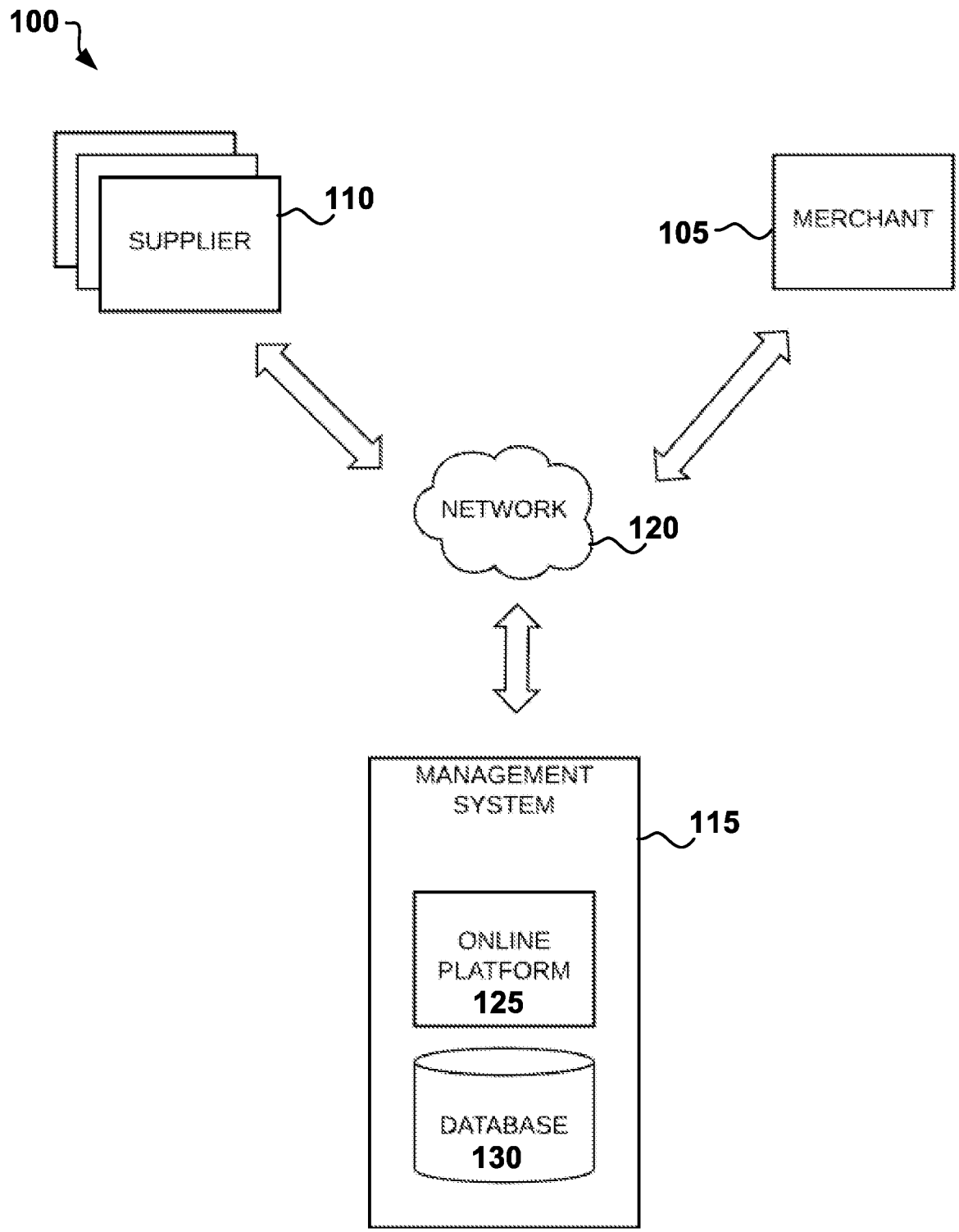
FIG. 1 illustrates an example computer system environment for practicing methods for processing merchandise shipping.

Various configurations and embodiments of the disclosure are described in detail below. While specific implementations are described, it should be understood that this is done for illustration purposes only. Other components and configurations may be used without parting from the spirit and scope of the disclosure.

The concepts and embodiments described herein are designed to ensure a business has appropriate measures to mitigate any delays within a supply chain from one or more suppliers as a result of errors or omissions in handling and processing of routing requests, shipping, and delivery of merchandise. For purposes of this disclosure, the terms "merchant" and "business" can be used interchangeably and shall be construed to mean a purchaser or an organization that makes purchases of goods from one or more suppliers. Some examples of "merchant" can include, but not limited to, a retail store, a retailer, a wholesale merchant, a distributor, a dealership, and so forth. Further, for purposes of this disclosure, the terms "supplier" and "vendor" can be used interchangeably and shall be construed to mean an organization that sells goods to one or more merchants. Some examples of "supplier" can include, but not limited to, a manufacture, a warehouse, a distributor, and so forth. Furthermore, for purposes of this disclosure, the terms "goods," "products," "commodity," and "merchandise" can be used interchangeably and shall be construed to mean tangible items that are a subject of sale from a supplier to a merchant.

The concepts and embodiments of this disclosure provide for an online platform that can be controlled or maintained by a merchant. Suppliers of the merchant can access or visit the online platform. In some configurations, the online platform can include, host, be connected to, or be associated with a website that can be accessed by the suppliers. In other configurations, the online platform can be operatively connected to computers of the suppliers without the need to host a website. For example, the suppliers can exchange data with the online platform using application programming interface codes generated, for example, by software applications installed on computers of the suppliers. In certain embodiments, the online platform is configured to process purchase orders of the merchant and routing requests of the suppliers.

The online platform can be configured to generate, assist in generating, maintain, or receive purchase orders of the merchant. As used herein, the term "purchase order" refers to a commercial document, such as an electronic document, generated by a merchant to a supplier, indicating a product type, quantity, and a price for a product that the supplier will provide to the merchant. When a purchase order of the merchant is generated for a certain product, the online platform can maintain, store, or process the purchase order. For example, the online platform can electronically send the purchase order to the supplier. In certain configurations, once the purchase order is generated or received by the online platform, a timer is activated. The timer can be configured to count passage a period of time according to a predetermined rule. The term "timer" may also mean a clock, a counter, and a stop-watch. The timer can count passage of time from zero to a value or from a value down to zero.

Within the predetermined period, the supplier can confirm fulfilment of the purchase order through the online platform. For example, the supplier can access the online platform to respond to the purchase order by sending a confirmation message. The confirmation message can inform the merchant or the online platform that the supplier can or cannot fulfill the purchase order of the merchant. In either case, the online platform can inform or alert the merchant that the confirmation message is received.

If the supplier indicates, in the confirmation message, that the supplier can or will fulfill the purchase order, the online platform can predict a shipping location of the product based on historical data. For these ends, the online platform constantly or repeatedly collects the historical information of one or more suppliers indicating past performance of the suppliers, past shipping data of the suppliers, past routing requests of the suppliers, and any other related information. For example, if a certain product is repeatedly purchased from a selected supplier, and the product is shipped substantially from one and the same location, the online platform can predict that the product of a newly placed purchase order will be also shipped from the same location and in the same amount. In addition, the dimensions of the shipment may also be predicted based on prior dimensional data for the type of product and/or supplier.

If the supplier indicates, in the confirmation message, that the suppliers cannot fulfill the purchase order or when no confirmation message is received within the predetermined period, as determined by the timer, a default operation can be initiated by the online platform. The default operation can include canceling the purchase order, communicating to the supplier to request fulfilment of the purchase order, or sending an updated purchase order based on updated terms. In some embodiments, the default operation can include establishing, at the online platform, a predicted shipping location of a product of the supplier based on historical data and causing shipment of the product from the predicted shipping location.

In certain embodiments, the online platform can be a part of a computer management system associated with one or more merchants. Accordingly, the embodiments of this disclosure improve the operation of computer management system by, at least, processing routing requests in response to purchase orders and by minimizing the number of queries used to track purchase orders, routing requests, and shipments of products. In addition, the efficiency and speed of the computer system for processing transactions and communicating with suppliers are improved. The computer system does not need to waste resources tracking multiple open purchase orders for the same item. This improvement of the operation of computer management system further constitutes a solution of a technological problem existing in the art.

These examples and others will be further described as the illustrations of the disclosure are described in detail below. While specific implementations are described, it should be understood that this is done for illustration purposes only. Other components and configurations may be used without parting from the spirit and scope of the disclosure. In addition, components, steps, and features described may be removed, added, or combined from the provided examples.

FIG. 1 illustrates an example computer system environment 100 for practicing the methods for processing merchandise shipping. The computer system environment 100 includes at least one merchant 105, one or more suppliers 110, and a management system 115 (also referred to as a system for processing merchandise shipping). Each of merchant 105 and suppliers 110 can include or are represented by a computing device such as a desktop computer, laptop computer, tablet computer, network computer, workstation, thin client, cellular phone, smart phone, user terminal, and the like. Management system 115 can also refer to a computing device such as a server. Each of merchant 105, suppliers 110, and management system 115 can be equipped with a network interface or a functionality for data communication over a data network. More particularly, merchant 105, suppliers 110, and management system 115 can be operatively connected with one another via one or more data networks 120. Data network 120 can refer to any wired, wireless, or optical network.

Management system 115 can include at least one processor and at least one memory storing processor-readable instructions which, when executed by the processor, cause the management system, its components (e.g., the processor), or other elements to perform operations of the method of processing merchandise shipping as described herein. For example, management system 115 can implement processing of merchandise routing and shipping. Further, as shown in FIG. 1, management system 115 can include an online platform 125 and a database 130. Management system 115 or online platform 125 can include a timer to count passage a period of time according to a predetermined rule. Online platform 125 can include or be operatively associated with a website, a web service, an online service, or their analogues for implementing at least some operations of the method of processing merchandise shipping as described herein. For example, online platform 125 can be associated with or host a web site that can be accessed by merchant 105 and suppliers 110. Online platform 125 can be configured to provide a graphical user interface to display one or more purchase orders to suppliers 110, receive inputs of suppliers 110 concerning purchase orders of merchants 105, and display the timer indicating remaining time until a predetermined period is expired. For example, the graphical user interface can enable merchant 105 to generate purchase orders and review confirmation messages. In addition, the graphical user interface of online platform 125 can enable suppliers 110 to receive and review the purchase orders, as well as generate and send confirmation messages. In some configurations, suppliers 110 and merchant 105 should be authenticated or validated prior to the access of online platform 125 (e.g., by checking user credentials such as logins and passwords).

Database 130 is configured to store certain historical data associated with past shipments and past purchase orders. Accordingly, management system 115 can be configured to collect the historical data from the purchase orders placed by merchant 105, confirmation messages of suppliers 110, routing requests of suppliers 110, and any other communication or performance by merchant 105 and suppliers 110.

Figure 2:
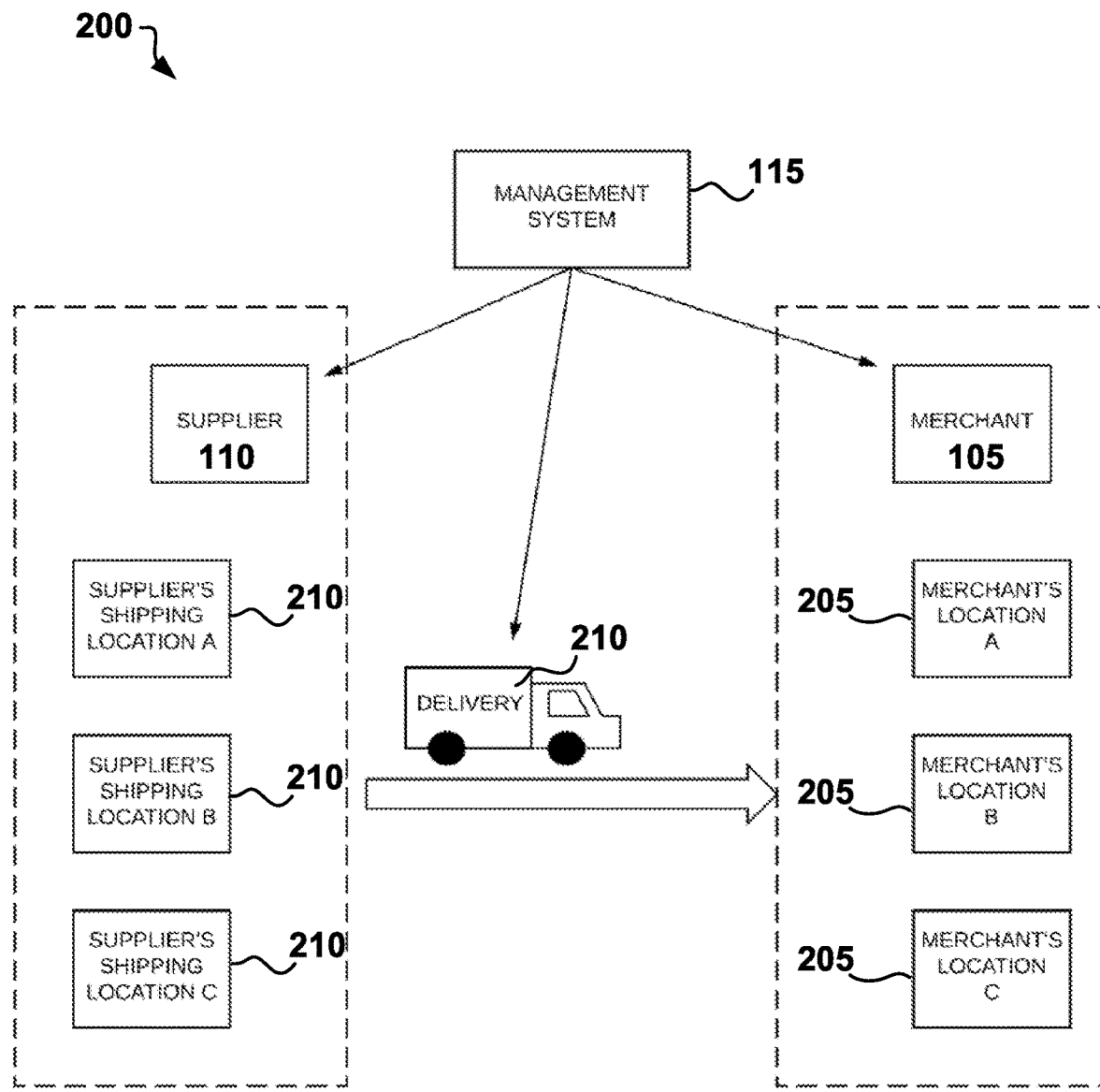
FIG. 2 illustrates a simplified block diagram showing processing of merchandise routing and shipping according to one example embodiment.

FIG. 2 illustrates a simplified block diagram 200 showing processing of merchandise routing and shipping according to one example embodiment. As shown in this figure, merchant 105 can include one or more merchant locations 205 such as merchant's delivery locations, merchant's warehouses, merchant's stores, merchant's storage locations, and so forth. Similarly, supplier 110 can include one or more supplier's shipping locations 210. Each supplier's shipping location 220 can be associated with a supplier's warehouse, supplier's storage, supplier's store, and the like.

Management system 115 of this disclosure is configured to electronically coordinate or manage purchasing, routing, shipping, and delivering products from supplier 110 to merchant 105. In some configurations, management system 115 can enable merchant 105 to generate or place a purchase order and deliver the same to supplier 110. The purchase order can indicate one or more of the following: an identification of merchant 105, an identification of supplier 110, a product type, a product quantity, a price, a shipping location, a delivery location, and optionally other shipment or purchase requirements. As soon as the purchase order is generated, management system 115 can alert supplier 110.

Further, management system 115 can be configured to generate or receive from supplier 110 a confirmation message in response to the purchase order. The confirmation message can indicate one or more of the following: an identification of merchant 105, an identification of supplier 110, a product type, a product quantity, a price, a shipping location, a delivery location, a shipping weight, a shipping dimensions, and optionally other shipment requirements. As soon as the confirmation message is generated or received, management system 115 can alert merchant 105.

In response to the confirmation message, management system 115 can cause delivery 215 from a selected supplier's shipping location 210 to a selected merchant location 105 according to predetermined settings, rules, or historical data. For example, management system 115 can be configured to select one or more vehicles and their parameters (e.g., weight-carrying ability, vehicle capabilities, or vehicle dimensions) based at least on one of the purchase order, the confirmation message, and the historical data, for example, for the dimensions of the order. Further, management system 115 can direct, cause direction, navigate, or cause navigation of the selected vehicles to one of supplier's shipping locations 210 and from supplier's shipping locations 210 to selected merchant location 105. Thus, for example, management system 115 causes delivery 215 from supplier's shipping location "C" to merchant's location "B" based on the purchase order, the confirmation message, or the historical data. Moreover, management system 115 can cause delivery 215 even when there is no confirmation message from supplier 110. For these ends, management system 115 can cause delivery 215 based on the historical data.

Figure 3:
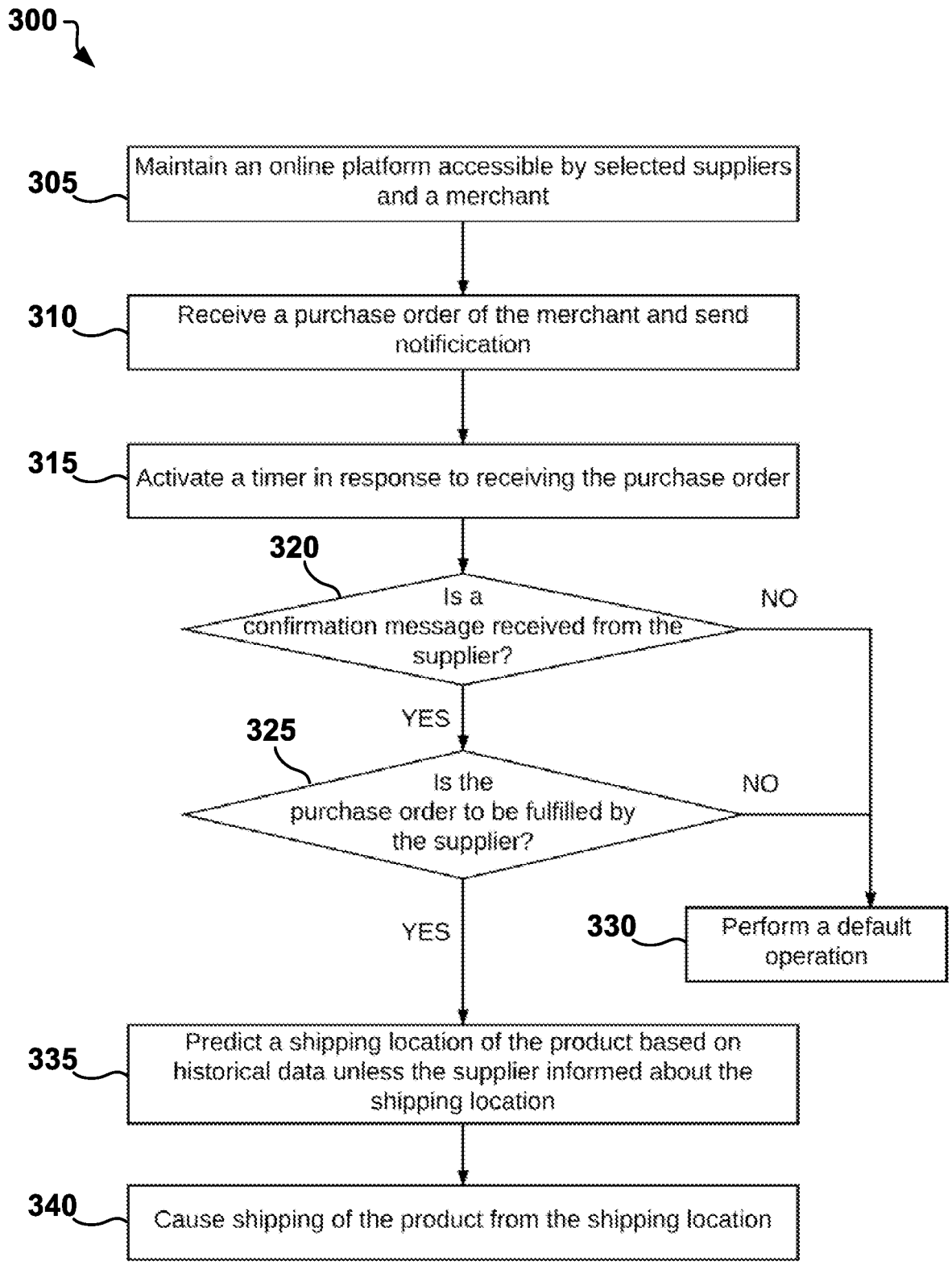
FIG. 3 illustrates an exemplary method embodiment.

FIG. 3 illustrates a process flow diagram showing an example method 300 for processing merchandise shipping according to one embodiment. Method 300 may be performed by processing logic that may comprise hardware (e.g., decision-making logic, dedicated logic, programmable logic, application-specific integrated circuit, and microcode), software (such as software run on a general-purpose computer system or a dedicated machine), or a combination of both. In one example embodiment, the processing logic refers to management system 115 as described above. Below recited operations of method 300 may be implemented in an order different than described and shown in the figure. Moreover, method 300 may have additional operations not shown herein, but which can be evident for those skilled in the art from the present disclosure. Method 300 may also have fewer operations than outlined below and shown in FIG. 3.

Method 300 commences at operation 305 with management system 115 maintaining online platform 125 which is accessible by selected suppliers 110 and merchant 105 as described above with reference to FIG. 1.

At operation 310, management system 115 receives, through online platform 125, a purchase order of merchant 105. The purchase order indicates at least supplier 110 and a product. The purchase order can also indicate other information such as a price, product quantity, predicted shipping location, and delivery location, among others.

In response to receiving the purchase order, at operation 315, management system 115 activates a timer such as a timer for counting elapsing time of a predetermined period. As discussed above, online platform 125 of management system 115 can display the purchase order and the timer. Furthermore, management system 115 can optionally send at least one first notification to supplier 110 when the purchaser order is received from merchant 105. Management system 115 can optionally send reminders or other notifications to supplier 110 to inform that the timer is about to expire or expired.

At operation 320, management system 115 determines if a confirmation message is received by management system 115 (or online platform 125) from supplier 110 within the predetermined period and in response to the purchase order. As discussed above, the confirmation message can be generated through the graphical user interface of online platform 125. Furthermore, management system 115 can optionally send at least one second notification to merchant 105 when the confirmation message is received from supplier 110. In some embodiments, the confirmation message includes a routing request of supplier 110.

If it is determined that the confirmation message is received within the predetermined period, method 300 proceeds to operation 325 where management system 115 determines if the purchase order is to be fulfilled by the supplier based at least on the confirmation message and optionally the historical data. For example, the confirmation message can directly indicate that the purchase order is to be fulfilled by supplier 110. The confirmation message can also indicate a shipping location, a shipping (consignment) size, a shipping (consignment) weight, and optionally any other information relevant to the product, routing process, or shipment process. Otherwise, if it is determined at operation 320 that the confirmation message is not received within the predetermined period, method 300 proceeds to operation 330 where management system 115 performs a default operation.

If it is determined at operation 325 that the purchase order is to be fulfilled by the supplier, method 300 proceeds to operation 335. At operation 335, management system 115 predicts a shipping location of the product based on the historical data stored in database 130. The prediction can be implemented based on one or more of the following: a statistical analysis of the historical data, a heuristic analysis of the historical data, a machine-learning analysis of the historical data, and the like. If it is determined at operation 325 that the purchase order is not to be fulfilled by the supplier, method 300 proceeds to the default operation performed at operation 330.

At operation 340, management system 115 causes a shipment of the product from the shipping location based on the purchase order and at least one of the confirmation message and the historical data. For example, at operation 340, management system 115 can generate one or more shipment routings for the shipping location based at least in part on the purchase order. In addition, management system 115 can create one or more routes, route lists, navigation instructions, and the like, or otherwise cause one or more vehicles to deliver the product from the selected supplier's shipment location to the selected merchant's location.

In additional embodiments, method 300 can include operations of receiving or collecting, by management system 115, shipping data from one or more suppliers 110. The shipping data can indicate an updated shipping location and a quantity of the product. For example, after the confirmation message was sent, supplier 110 can update the shipping location or any other shipment parameters (e.g., shipment dimensions, weight, etc.). In response to the shipping data, management system 115 changes the shipping location to the updated shipping location and causes additional shipping of the product from the updated shipping location when the quantity of the product is less than a predetermined threshold.

Default operation 330 can include, for example, canceling of the purchase order of merchant 105. In another configuration, default operation 330 can include operations of establishing, by management system 115, a predicted shipping location of the product based on the historical data and causing, by management system 115, shipment of the product from the predicted shipping location to the selected merchant's location. In yet another configuration, default operation 330 can cause management system 115 communicate to supplier 110 to request fulfilment of the purchase order or sending an updated purchase order based on updated terms.

In additional embodiments, method 300 can include operations of forecasting, by management system 115, a demand in the product based on the historical data and, based on the demand, proactively generate one or more new purchase orders to supplier 110. The forecasting can be implemented using one or more of the following: a statistical analysis of the historical data, a heuristic analysis of the historical data, a machine-learning analysis of the historical data, and so forth.

In yet additional embodiments, method 300 can include operations of calculating, by management system 115, a fill rate of the product based on comparison of a quantity of the product in the shipment and the quantity of the product in the purchase order. Based on the fill rate, management system 115 can proactively generate one or more new purchase orders to supplier 110.

In yet additional embodiments, method 300 can include operations of determining, by management system 115, dimensions and a weight of a shipment of the product from the shipping location of supplier 110. Management system 115 can be also configured to allocate one or more of predetermined vehicles based on the dimensions, the weight of shipment, and characteristics of predetermined vehicles (such as capabilities of predetermined vehicles). In some embodiments, the estimated dimensions and weight of the shipment may be provided by the supplier. The supplier provided dimensions and weight may be compared to the historical data for the same or similar types of shipments. The historical data may be used to determine estimated dimensions and weight for the shipment. A percentage of understatement and/or overstatement of the dimensions/weight may be allowed. Any values that fall outside of the range may be flagged for additional investigation. For example, the order may call for 1000 cases of an item. The system can determine estimated physical characteristics of the 1000 cases. If one or more of the supplier provided physical characteristics fall outside of the selected percentage range, the order may be flagged as questionable, and may be further investigated before acceptance by the merchant.

In yet additional embodiments, method 300 can include operations of capturing and storing, by management system 115, performance data of supplier 110 concerning the purchase order and one or more additional purchase orders. Management system 115 can further generate or update the historical data based on the performance data. The performance data can include information indicating the actual shipment process and the actual delivery process from supplier 110 to merchant 105.

Figure 4:
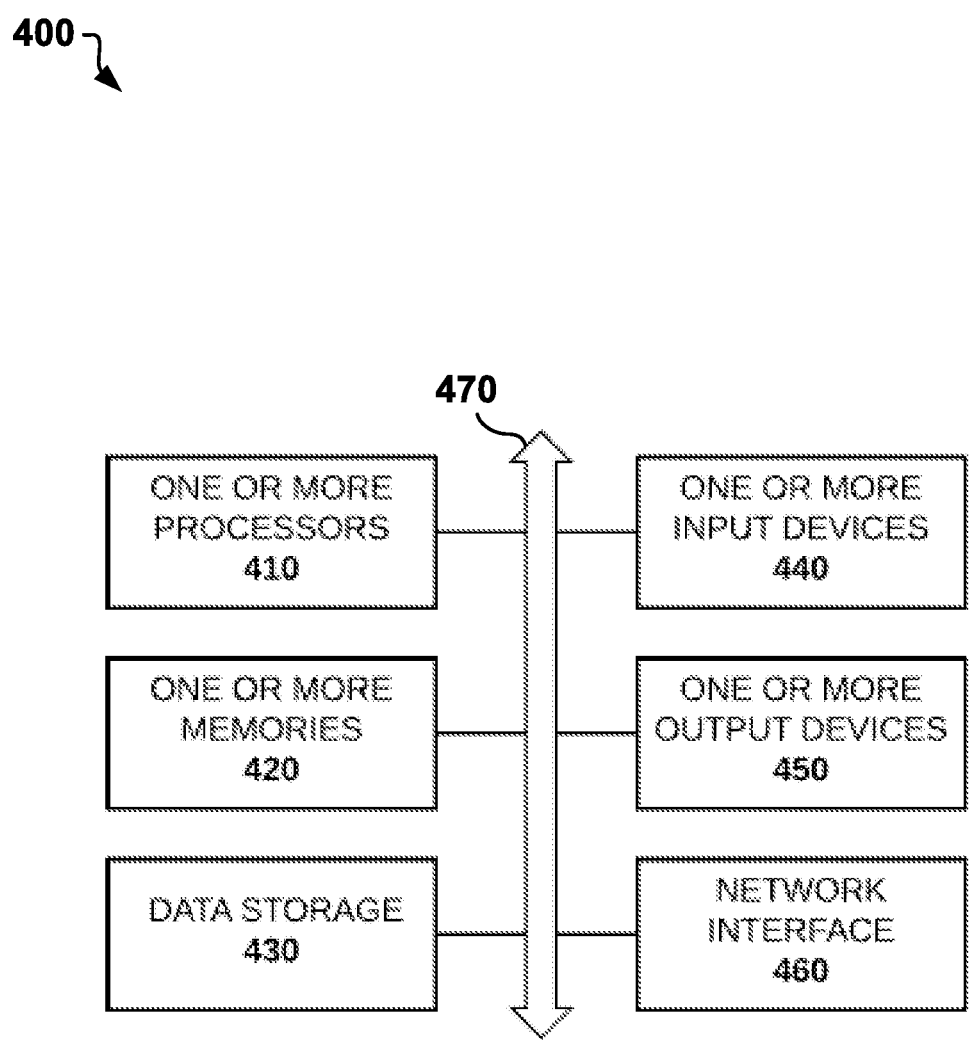
FIG. 4 illustrates an example computer system which can be used to process merchandise shipping.

FIG. 4 illustrates an example computer system 400 which can be used to perform the method processing merchandise shipping as disclosed herein. Computer system 400 can be an instance of at least one of merchant 105, supplier 110, and management system 115 shown in FIG. 1 and FIG. 2. With reference FIG. 4, computing system 400 includes one or more processors 410, one or more memories 420, one or more data storages 430, one or more input devices 440, one or more output devices 450, network interface 460, one or more optional peripheral devices, and a communication bus 470 for operatively interconnecting the above-listed elements. Processors 410 can be configured to implement functionality and/or process instructions for execution within computing system 400. For example, processors 410 may process instructions stored in memory 420 or instructions stored on data storage 430. Such instructions may include components of an operating system or software applications.

Memory 420, according to one example, is configured to store information within computing system 400 during operation. For example, memory 420 can store instructions to perform the methods for processing merchandise shipping. Memory 420, in some example embodiments, may refer to a non-transitory computer-readable storage medium or a computer-readable storage device. In some examples, memory 420 is a temporary memory, meaning that a primary purpose of memory 420 may not be long-term storage. Memory 420 may also refer to a volatile memory, meaning that memory 420 does not maintain stored contents when memory 420 is not receiving power. Examples of volatile memories include RAM, dynamic random access memories (DRAM), static random access memories (SRAM), and other forms of volatile memories known in the art. In some examples, memory 420 is used to store program instructions for execution by processors 410. Memory 420, in one example, is used by software applications or mobile applications. Generally, software or mobile applications refer to software applications suitable for implementing at least some operations of the methods as described herein.

Data storage 430 can also include one or more transitory or non-transitory computer-readable storage media or computer-readable storage devices. For example, data storage 430 can store instructions for processor 410 to implement the methods described herein. In some embodiments, data storage 430 may be configured to store greater amounts of information than memory 420. Data storage 430 may be also configured for long-term storage of information. In some examples, data storage 430 includes non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Computing system 400 may also include one or more input devices 440. Input devices 440 may be configured to receive input from a user through tactile, audio, video, or biometric channels. Examples of input devices 440 may include a keyboard, keypad, mouse, trackball, touchscreen, touchpad, microphone, video camera, image sensor, fingerprint sensor, or any other device capable of detecting an input from a user or other source, and relaying the input to computing system 400 or components thereof.

Output devices 450 may be configured to provide output to a user through visual or auditory channels. Output devices 450 may include a video graphics adapter card, display, such as liquid crystal display (LCD) monitor, light emitting diode (LED) monitor, or organic LED monitor, sound card, speaker, lighting device, projector, or any other device capable of generating output that may be intelligible to a user. Output devices 450 may also include a touchscreen, presence-sensitive display, or other input/output capable displays known in the art.

Computing system 400 can also include network interface 460. Network interface 460 can be utilized to communicate with external devices via one or more communications networks such as data network 120 or any other wired, wireless, or optical networks. Network interface 460 may be a network interface card, such as an Ethernet card, an optical transceiver, a radio frequency transceiver, or any other type of device that can send and receive information.

An operating system of computing system 400 may control one or more functionalities of computing system 400 or components thereof. For example, the operating system may interact with the software or mobile applications and may facilitate one or more interactions between the software/mobile applications and processors 410, memory 420, data storages 430, input devices 440, output devices 450, and network interface 460. The operating system may interact with or be otherwise coupled to software applications or components thereof. In some embodiments, software or mobile applications may be included in the operating system.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method by at least one processor, the method comprising:
   maintaining an online platform accessible by selected suppliers and a merchant;
   receiving, through the online platform, a purchase order of the merchant, the purchase order indicating at least a supplier and a product;
   in response to receiving the purchase order, activating a timer for counting elapsing time of a predetermined period;
   determining if a confirmation message is received, through the online platform, from the supplier within the predetermined period based on the timer and in response to the purchase order;
   determining that the purchase order is to be fulfilled by the supplier based at least on the confirmation message when it is determined that the confirmation message is received within the predetermined period;
   based at least on the determination that the purchase order is to be fulfilled by the supplier, predicting a shipping location of the product based on historical data comprising performing an analysis of the historical data to determine that:
the product has been previously purchased from the supplier; and
the product has been previously shipped from the shipping location;
determining, via a processor accessing a database of product information, dimensions and a weight of a shipment of the product from the shipping location;
allocating one or more of predetermined vehicles based on the dimensions, the weight of a shipment, and characteristics of predetermined vehicles;
creating, via the processor and based on the purchase order, the shipping location, and a destination location of the merchant, a route and navigation instructions for the one or more predetermined vehicles;
causing shipment of the product from the shipping location via the route according to the navigation instructions;
receiving, through the online platform, a second purchase order of the merchant, the second purchase order indicating at least a second supplier and a second product;
in response to receiving the second purchase order, activating the timer for counting elapsing time of the predetermined period;
determining that a second confirmation message is not received in response to the second purchase order, through the online platform, from the supplier within the predetermined period based on the timer; and
causing a default operation in response to determining that the second confirmation message is not received within the predetermined period.

2. The method of claim 1, further comprising:
receiving, through the online platform, shipping data from the supplier, the shipping data indicating an updated shipping location and a quantity of the product;
changing the shipping location to the updated shipping location; and
causing additional shipping of the product from the updated shipping location when the quantity of the product is less than a predetermined threshold.

3. The method of claim 1, further comprising:
wherein the default operation includes transmitting a request to the supplier to fulfill the second purchase order.

4. The method of claim 1, wherein the default operation includes canceling of the purchase order.

5. The method of claim 1, wherein the default operation includes:
establishing the predicted shipping location of the product based on the historical data; and
causing shipment of the product from the predicted shipping location.

6. The method of claim 1, wherein the default operation includes:
sending an updated purchase order based on updated terms to the supplier.

7. The method of claim 6, further comprising:
causing the default operation based on receiving a second confirmation message in response to the updated purchase order.

8. The method of claim 7, wherein the default operation includes canceling of the updated purchase order.

9. The method of claim 7, wherein the default operation includes:
communicating to the supplier to request fulfilment of the updated purchase order.

10. The method of claim 1, wherein the online platform is configured to display the purchase order to the supplier, receive an input of the supplier concerning the purchase order, and display the timer indicating remaining time until the predetermined period is expired in response to the input.

11. The method of claim 1, further comprising:
sending at least one first notification to the supplier when the purchaser order is received; and sending at least one second notification to the merchant when the confirmation message is received from the supplier.

12. The method of claim 1, further comprising:
sending at least one third notification to the supplier when the timer is about to expire.

13. The method of claim 1, further comprising:
forecasting a demand in the product based on the historical data; and
based on the demand, proactively generating one or more new purchase orders to the supplier.

14. The method of claim 1, further comprising:
calculating a fill rate of the product based on comparison of a quantity of the product in a shipment and a quantity of the product in the purchase order;
based on the fill rate, proactively generating one or more new purchase orders to the supplier.

15. The method of claim 1, further comprising:
capturing and storing performance data of the supplier concerning the purchase order and one or more additional purchase orders; and
generating or updating the historical data based on the performance data.

16. The method of claim 1, wherein the confirmation message includes a routing request of the supplier.

17. The method of claim 1, further comprising:
generating one or more shipment routings for the shipping location based at least in part on the purchase order.

18. A system for processing merchandise shipping, the system comprising:
a database storing historical data associated with past shipments and purchase orders; and
a server maintaining an online platform accessible by selected suppliers and a merchant, wherein the server is configured to:
receive, through the online platform, a purchase order of the merchant, the purchase order indicating at least a supplier and a product;
in response to receiving the purchase order, activate a timer for counting elapsing time of a predetermined period;
determine if a confirmation message is received, through the online platform, from the supplier within the predetermined period based on the timer and in response to the purchase order;
determine that the purchase order is to be fulfilled by the supplier based at least on the confirmation message when it is determined that the confirmation message is received within the predetermined period;
based at least on the determination that the purchase order is to be fulfilled by the supplier, predict a shipping location of the product based on historical data comprising performing an analysis of the historical data to determine that:
the product has been previously purchased from the supplier; and the product has been previously shipped from the shipping location;

determine dimensions and a weight of a shipment of the product from the shipping location;

determine, via a processor accessing a database of product information, dimensions and a weight of a shipment of the product from the shipping location;

allocate one or more of predetermined vehicles based on the dimensions, the weight of a shipment, and characteristics of predetermined vehicles;

create, via the processor and based on the purchase order, the shipping location, and a destination location of the merchant, a route and navigation instructions for the one or more predetermined vehicles;

cause shipment of the product from the shipping location via the route according to the navigation instructions;

receive, through the online platform, a second purchase order of the merchant, the second purchase order indicating at least a second supplier and a second product;

in response to receiving the second purchase order, activate the timer for counting elapsing time of the predetermined period;

determine that a second confirmation message is not received in response to the second purchase order, through the online platform, from the supplier within the predetermined period based on the timer; and cause a default operation in response to determining that the second confirmation message is not received within the predetermined period.

19. The system of claim 18, wherein the analysis of the historical data comprises a machine-learning analysis.

20. A non-transitory processor-readable medium having instructions stored thereon, which when executed by one or more processors, cause the one or more processors to implement a method for processing merchandise shipping, the method comprising:

maintaining an online platform accessible by selected suppliers and a merchant;

receiving, through the online platform, a purchase order of the merchant, the purchase order indicating at least a supplier and a product;

in response to receiving the purchase order, activating a timer for counting elapsing time of a predetermined period;

determining if a confirmation message is received, through the online platform, from the supplier within the predetermined period based on the timer and in response to the purchase order;

determining that the purchase order is to be fulfilled by the supplier based at least on the confirmation message when it is determined that the confirmation message is received within the predetermined period;

based at least on the determination that the purchase order is to be fulfilled by the supplier, predicting a shipping location of the product based on historical data comprising performing an analysis of the historical data to determine that:
the product has been previously purchased from the supplier; and
the product has been previously shipped from the shipping location;

determining, via a processor accessing a database of product information, dimensions and a weight of a shipment of the product from the shipping location;

allocating one or more of predetermined vehicles based on the dimensions, the weight of a shipment, and characteristics of predetermined vehicles;

creating, via the processor and based on the purchase order, the shipping location, and a destination location of the merchant, a route and navigation instructions for the one or more predetermined vehicles;

causing shipment of the product from the shipping location via the route according to the navigation instructions;

receiving, through the online platform, a second purchase order of the merchant, the second purchase order indicating at least a second supplier and a second product;

in response to receiving the second purchase order, activating the timer for counting elapsing time of the predetermined period;

determining that a second confirmation message is not received in response to the second purchase order, through the online platform, from the supplier within the predetermined period based on the timer; and causing a default operation in response to determining that the second confirmation message is not received within the predetermined period.

* * * * *